United States Patent
Segura Jobal

(10) Patent No.: US 7,011,044 B2
(45) Date of Patent: Mar. 14, 2006

(54) STATION FOR PREPARING CLEANING DISINFECTING DELOUSING AND HYDROMASSAGING ANIMALS

(76) Inventor: Eduardo Segura Jobal, Artesanos, S/N 43800 Valls, Tarragona (ES)

( * ) Notice: Subject to any disclaimer, the term of this patent is extended or adjusted under 35 U.S.C. 154(b) by 22 days.

(21) Appl. No.: 10/503,715

(22) PCT Filed: Mar. 22, 2002

(86) PCT No.: PCT/ES02/00146

§ 371 (c)(1),
(2), (4) Date: Aug. 6, 2004

(87) PCT Pub. No.: WO03/079774

PCT Pub. Date: Oct. 2, 2003

(65) Prior Publication Data

US 2005/0150467 A1    Jul. 14, 2005

(51) Int. Cl.
*A01K 13/00*    (2006.01)
(52) U.S. Cl. ........................ 119/671; 119/669
(58) Field of Classification Search ................ 119/671, 119/673, 664, 668, 604, 606, 656, 658, 666, 119/669, 677, 678
See application file for complete search history.

(56) References Cited

U.S. PATENT DOCUMENTS

| | | | |
|---|---|---|---|
| 2,499,174 A | * | 2/1950 | Turner ........................ 119/665 |
| 3,884,191 A | * | 5/1975 | Stout .......................... 119/671 |
| 4,056,078 A | | 11/1977 | Blafford et al. |
| 4,057,032 A | * | 11/1977 | Dimitriadis ................. 119/671 |
| 4,382,424 A | * | 5/1983 | Altissimo .................... 119/668 |
| 4,505,229 A | | 3/1985 | Altissimo |
| 4,549,502 A | | 10/1985 | Namdari |
| 4,730,576 A | * | 3/1988 | Yoshikawa .................. 119/673 |
| 5,435,269 A | | 7/1995 | Chen |
| 5,448,966 A | * | 9/1995 | McKinnon et al. ......... 119/676 |
| 5,630,379 A | * | 5/1997 | Gerk et al. ................. 119/667 |
| 5,724,918 A | * | 3/1998 | Navalon-Chicote ......... 119/668 |
| 5,769,029 A | * | 6/1998 | Marshall ..................... 119/651 |
| 6,435,136 B1 | * | 8/2002 | Segura Munoz ............ 119/650 |
| 6,688,257 B1 | * | 2/2004 | Lee ............................ 119/671 |

FOREIGN PATENT DOCUMENTS

| | | |
|---|---|---|
| EP | 0 034 123 A | 8/1981 |
| EP | 0 673 599 A | 9/1995 |
| EP | 0 861 590 A | 9/1998 |
| EP | 1 050 211 A | 11/2000 |
| FR | 2 753 877 A | 4/1998 |

* cited by examiner

*Primary Examiner*—Yvonne R. Abbott
(74) *Attorney, Agent, or Firm*—Birch, Stewart, Kolasch & Birch, LLP

(57) ABSTRACT

The invention relates to a cleaning station comprising a glass enclosure (2) in which the animals are prepared before and after washing. The glass enclosure (2) comprises the actual washing enclosure (1) and a control panel (3) which are controlled by a controller or PLC. According to the invention, the interior of the enclosure (1) is disinfected with each washing procedure. Moreover, the invention comprises: safety a mechanism for the hydraulic circuit and the electronics which are actuated when the door (72) of the enclosure (1) or the switchboard is opened, a frequency variator/converter which can be used to adjust the flow of air and water, and moisture and unpleasant odour extractors.

22 Claims, 7 Drawing Sheets

STATION FOR PREPARING CLEANING DISINFECTING DELOUSING AND HYDROMASSAGING ANIMALS

OBJECT OF THE INVENTION

The present invention relates to a station for conditioning, washing, deparasitation and hydromassage of animals, from among assemblies comprising an enclosure with the means required for conditioning, washing, disinfection and deparasitation of animals, which are also provided with means for control, safety and programming the assembly.

The invention is characterised by its special configuration, which allows including in a single assembly the means needed for conditioning before and after washing, disinfection, deparasitation, hydromassage and drying.

The station consists of a glassed module insulated from the outside in which the pet is conditioned before bathing it; inside this glassed module is an enclosure where a disinfection process takes place before washing and rinsing, with the hydromassage effect obtained for animals by means of water applied at a controlled pressure; the animals are also dried and deparasitised inside this enclosure.

It incorporates a hydraulic circuit for the cleaning and rinsing process provided with the elements required for this function. This hydraulic circuit incorporates a lime remover at the inlet of the general water mains for processing the water, providing an improved performance on the animal's fur and preventing lime deposits on the circuit elements.

The invention is also characterised by incorporating a hydraulic circuit that performs a disinfection process of the cabin before each new animal is bathed.

Liquids are drained by a single motorised pump and logical switching of the washing and rinsing circuit electrovalves.

Said module is also provided with an extractor fan for evacuating bad odours and renewing the air.

It incorporates an automated hygrometer which, upon detecting a controlled humidity level, turns on another extractor fan that evacuates and renews the air in the machinery and equipment enclosure. On one hand this avoids damage to the equipment and components, and on the other the pets are dried faster.

It is provided with a pressure controller (pressostat) as a safety device which, in the event of a pressure increase, will electrically disconnect the circulation pump and cut off water passage to the hydraulic circuit. Thus, the components of the equipment and the animals are not harmed. A pressure gauge indicates the working pressure in the hydraulic circuit. The hydraulic circuit includes a regulator to set the pressure and flow best suited for the animals and the working process of the equipment.

The floor of the enclosure on which the animal is placed can swivel and fold, and incorporates a load cell which detects the presence of the animal and blocks and prevents the disinfection process, as highly concentrated products are used with a high disinfecting capacity to eliminate viruses, bacteria and fungi. Likewise, the load cell records the weight of the animal on a digital display.

It incorporates an intercommunication system for a remote checking of the unit allowing to monitor the operation and the levels of additives by sending a signal when these products are below a minimum level, in order to proceed to refill them.

At the microfilter output a pressostat is provided that detects the variation of water pressure between the microfilter inlet and outlet, sending a signal to the PLC so that if the pressure is lower than a predetermined one a signal is sent to the command control to indicate that the filter is saturated. After the filter has been cleaned the warning lamp and sound will be turned off.

It incorporates an air generation turbine to obtain the flow and pressure required to dry the animals. The air is projected through an opening located on the top of the cabin, allowing to displace the water on the animals downward. The air generation turbine is controlled with a frequency variator-converter that allows adjusting the pressure and airflow according to each animal. This adjustment is made from the control board.

A pressurised air generator is used to perform an automatic nozzle cleaning.

Thus, the present invention belongs to the field of means used to condition, wash, disinfect and hydromassage animals.

BACKGROUND OF THE INVENTION

Currently available in the market are several systems for washing and disinfecting animals, some of which operate in a more-or-less automated manner, but which present a series of disadvantages as described below.

None of the known systems is provided with a lime-removal unit for processing the water.

The enclosure where cleaning is performed lacks a module in which the pet can be conditioned before washing, or one to brush and groom it after washing. Likewise, available enclosures do not allow supplying additional products for washing, disinfection and deparasitation either manually or automatically.

They lack means for removing bad odours, as well as extraction fans to reduce the internal humidity level.

Other systems provided with pet drying processes lack means to control the frequency and voltage in order to adjust the air flow and pressure according to the needs of each pet, which means can also be used to adjust the frequency and voltage for use in the power grid of different countries.

In addition, currently available systems lack any means for performing an internal disinfection of the cabin before each bath. They also lack systems for detecting the pet inside the enclosure, as well as means for indicating the minimum and maximum levels of the water maintenance unit. Furthermore, available systems do not have means for controlling the water pressure and flow, nor a working pressure meter. They also lack protection systems against a possible pressure increase in the hydraulic system.

Current washing devices are provided with one pump for washing and another for evacuating the liquids, whereas it is now intended to develop a system that uses the same pump for the liquid evacuation process and for the washing and rinsing process.

They also do not incorporate a hydraulic system to disinfect the washing enclosure before washing each animal.

They also lack an automatic hygrometer, and an extractor to evacuate humidity.

They also lack intercommunication systems for remote monitoring of the unit or controlling the additive levels.

Drying systems are known that use a fan, but which have the disadvantage of lacking a variator-converter to regulate the air pressure and flow.

None of the presently known systems incorporate means for charging by tokens, cards or coins.

Thus, the object of the present invention is to overcome the above disadvantages by developing a station for conditioning, washing, disinfection and deparasitation and hydromassage as described below.

DESCRIPTION OF THE INVENTION

The invention taught herein, a station for conditioning, washing, disinfection and deparasitation and hydromassage of animals, comprises a glassed module with an area in which the animal can be conditioned before and after washing and drying, provided with an inner lamp, an extraction fan for air renewal and evacuation of bad odours.

Internally, the station is provided with an enclosure that is entered through a glassed door, which door incorporates a device that stops the various cycles if the door should be opened. It incorporates an internal lamp that is automatically turned on when a cycle begins and is turned off when it ends. Together with the enclosure are provided the necessary activation, control and safety verification means.

The station walls are made of a material that insulates from heat and cold, having a glassed area and another are provided with removable doors that allow accessing the machinery and equipment.

The enclosure where the washing, disinfection and deparasitation and hydromassage operation takes place is designed to ensure the comfort of the animals without causing them any harm or injury, as there are no moving or sharp elements inside it. The top part of the enclosure, its ceiling, is set inclined so that water drops will not fall on the animal after the washing, rinsing, deparasitation and drying operation has finished.

Both the washing and rinsing process and the liquid evacuation process are performed by a single pump and logical switching of the washing and rinsing circuit electrovalves, thereby simplifying the circuit.

The water circuit is provided with a cold water inlet from the mains water system through a lime remover that feeds a gas heater or electrical heater and simultaneously a thermostatic mixing valve, allowing to mix the cold water from the general system and the hot water from said gas heater or electrical heater in order to obtain the suitable water temperature for the animal washing and rinsing operation. This mixed water is sent to a hot water maintenance unit where the water is kept at the correct temperature for the washing and rinsing process. In addition, the hot water maintenance unit has a temperature probe that constantly sends signals to a temperature controller, which compares actual values with preselected ones and sends a signal to the programmable automat or PLC provided in the electronics system, so that if the temperature of the water maintenance unit is above or below the temperature selected in the temperature controller the corresponding electrovalve is opened, adding cold or hot water until the water is cooled or heated to the temperature selected in said controller. Likewise, if the water temperature is above or below said selected temperature, as a safety system the washing and rinsing cycles are blocked until the temperature matches the selected temperature. Said maintenance unit has two indicators for the minimum and maximum levels in order to monitor the water level and an overflow system that acts as an emergency drain.

The invention is also characterised in that it incorporates a hydraulic system that performed a cabin disinfection process before washing each different animal.

The floor of the enclosure where the animals are washed disinfected and deparasitised can swivel and fold, so that a load cell can be activated. If this cell detects the presence of an animal in the enclosure it sends a signal to the automat preventing the disinfection process from taking place, as the products used are highly concentrated and have high disinfection strength. It also sends a signal to a digital display where the animal's weight is displayed.

Likewise, the enclosure where the animal is washed, disinfected and deparasitised has with an overflow pipe at a certain height, which acts as an emergency drain if the gauge that controls the liquid-emptying means should fail.

The hydraulic circuit includes a device for controlling the water flow and pressure with which the pressure is adjusted to a suitable one for washing and rinsing the animals.

Also installed in the hydraulic system is a safety device or pressostat which controls and disconnects the electrical system, cutting off the water flow if there is a possible overpressure, preventing harm to the animal and equipment. A pressure gauge installed in the hydraulic system indicates the working pressure at all times.

The enclosure is provided with means to supply the liquids or other products required for washing and disinfection: a Venturi-effect system for automated aspiration activated by a water-circuit absorption and depression system. The flow is controlled by manual cone-needle regulation valves, and it is opened by electrovalves provided for such purpose. It is also possible to automatically supply the liquids or gels for washing and disinfection by pulse electrovalves or by a hydraulic injector.

The hydraulic circuit includes check valves to prevent water from returning to the disinfection and washing product tanks.

The spray nozzles provided inside the enclosure are removable nozzles that are designed and built in order to obtain a mist effect. On one hand water particles will not harm the animal, providing a hydromassage effect, and on the other they will soak the animal's fur so that the skin is reached, carrying away any dirt that may be there.

All of the station safety systems and programs are controlled by a PLC (Programmable Logic Programmer) in which are programmed the various cycles for washing, rinsing, deparasitising and disinfecting. It is provided with sequential indicators by which it is possible at all times to know the operation that is being performed and to view safety messages. Also provided is a sound system that uses a voice system to describe the various steps reached in the different cycles. A voice will provide the information displayed on the sequential indicators. It may be programmed in several languages.

Also provided is an intercommunication system that allows checking the operation of the cabin from a distance, as well as controlling the levels of additive products.

The different processes are initiated by a manual or automatic selector with a token, card or coin operated charging system.

Both the door of the washing cabin and the door of the electrical board have a safety switch that will stop any cycle if the door is opened. In addition, a manual stop switch is installed to stop the cycle at will.

A pressurised air generator is included to provide the airflow and pressure required to dry the animals. The air is propelled through an upper slit of the enclosure, so that the water is pushed down to facilitate drying the animal. A frequency variator-converter is installed for the drying cycle that allows adjusting the airflow and pressure generated by the turbine depending on the type of animal. This variator-converter is also used to adjust the rotation speed and pressure of the hydraulic circuit at the motor pump for washing, recirculation and drainage. This drive and control function is performed from the control board, thus allowing to set the different frequencies and voltages used in other countries.

The drying circuit includes a safety system to disconnect the drying cycle if the drying circuit overheats. This system is also provided with a temperature detector that constantly sends a signal to a temperature controller, which compares the actual values with the preselected ones, sending a signal to the programmable automat or PLC of the electronic system; if the drying temperature is higher than that preselected in the controller, the electrical supply is disconnected until the air is cooled to the selected temperature.

A filter is installed in the hydraulic circuit to retain any impurities that are removed from the animal, while a second microfilter collects water impurities to stop them from reaching the drain. A pressostat is incorporated at the outlet of the microfilter to detect the variation of water pressure between the microfilter inlet and outlet, sending a signal to the PLC if the pressure is less than the predetermined one and sending a signal to the control panel to indicate that the filter is saturated. After the filter has been cleaned the filter warning lamp and sound are turned off.

The station is provided with an extraction fan to renew the internal air and evacuate bad odours.

An automatic hygrometer is installed inside the enclosure of the station machinery and equipment; if this hygrometer detects a higher humidity than the set one another extraction fan, that is not the same as mentioned in the previous paragraph, is connected to extract the humidity from the enclosure.

In order to improve the view of the module and the enclosure two independent illumination systems are installed.

The machine is provided with counters to control the number of washings and dryings performed.

DESCRIPTION OF THE DRAWINGS

In order to complement the description provided below and to aid a better understanding of its characteristics the present descriptive memory is accompanied by a set of drawings, with figures which show the most significant details of the invention for purposes of illustration and in a non-limiting manner.

PREFERRED EMBODIMENT OF THE INVENTION

In view of the above-described figures a preferred embodiment of the invention is now described, as well as an explanation of the drawings.

Figure 1:
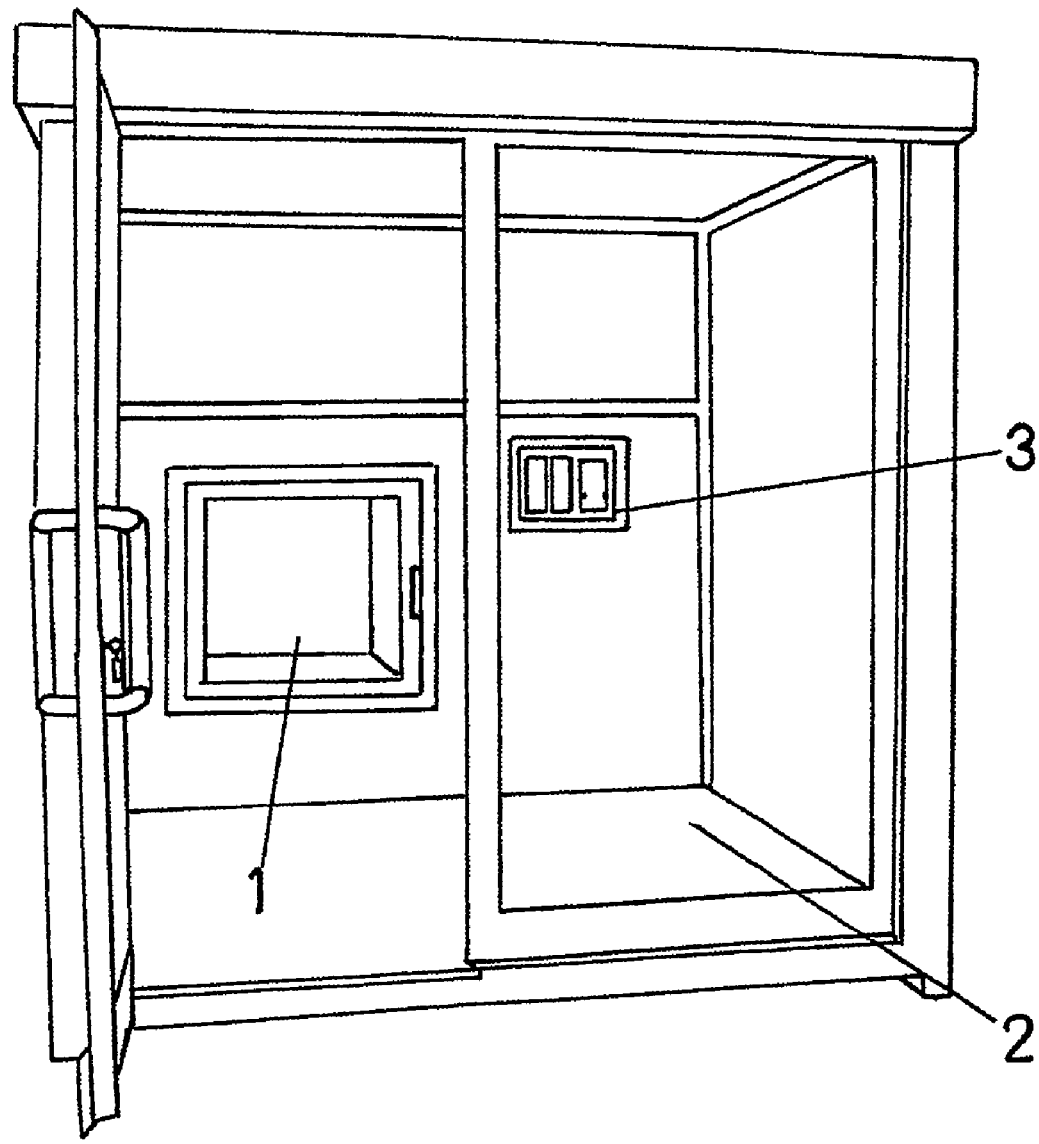
FIG. 1 shows a perspective view of the station object of the invention.

FIG. 1 shows how the station object of the invention is provided with a glassed module (2), inside which there is sufficient space to house a table and condition animals before and after washing. It is also provided with its own enclosure (1) for washing, rinsing, disinfecting and drying, with a control panel (3).

Figure 2:
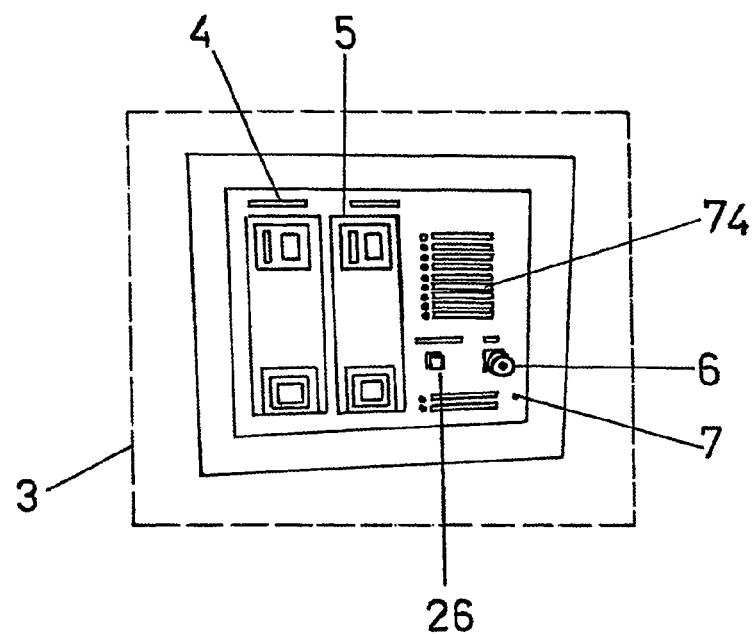
FIG. 2 shows the control panel of the station.

FIG. 2 shows the control panel (3), which is provided with a token slot (4) for the washing and drying service and another token slot (5) for optional drying. Also shown is the emergency stop button (6), the disinfection button (26) and the safety warnings (7), such as for water too hot or not enough water. Also provided is a warning system (7) to indicate that the microfilter (48) (FIG. 11) is saturated. Process sequential indication system (74).

Figure 3:
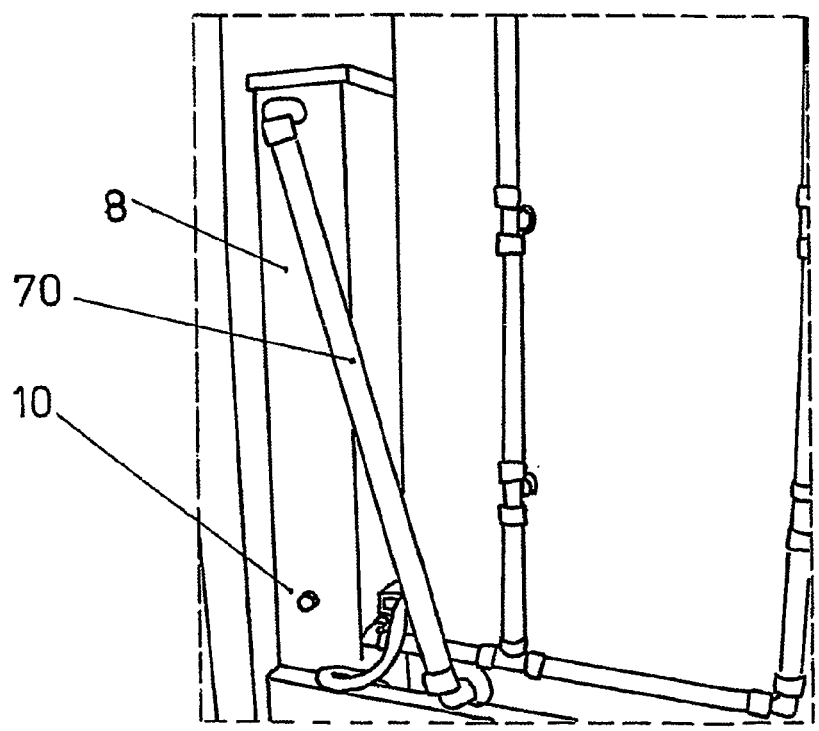
FIGS. 3 and 4 show the maximum and minimum levels and the overflow pipe of the unit for maintenance, inlet of water at a programmed temperature and inlet of cold or hot water.
Figure 4:
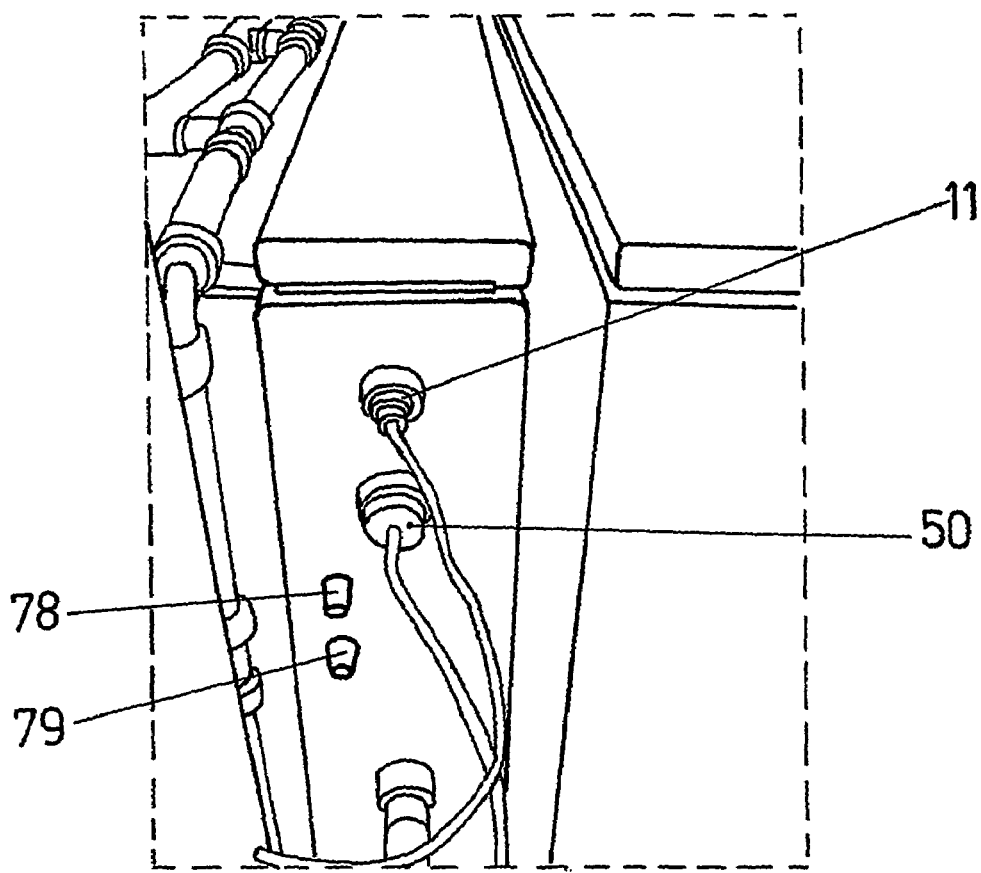
Figure 5:
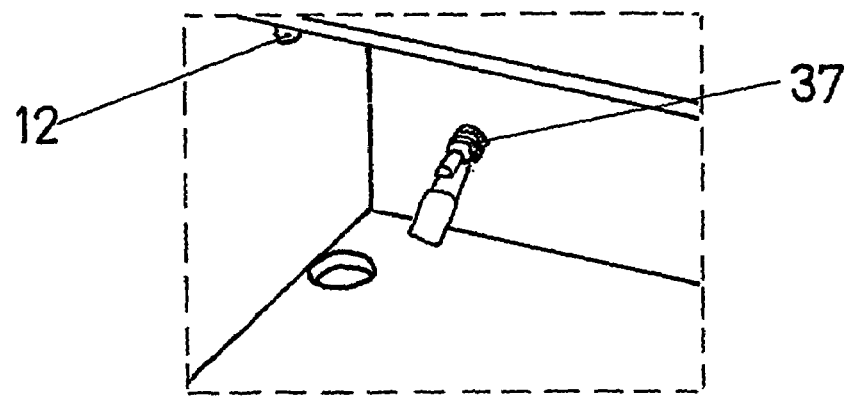
FIG. 5 shows the overflow pipe and the level monitor at the bottom of the enclosure.

FIGS. 3 and 4 show the minimum (10) and maximum (11) levels of the hot water maintenance unit (8) and the overflow pipe (70) as the safety measure if the control level should fail; also shown in the FIG. 4 is the temperature probe (50), the cold water inlet (78) and hot water inlet (79) to the maintenance unit that allow to adjust the preselected temperature, while FIG. 5 shows the overflow pipe (12) inside the enclosure (1) as a safety means in the event that the level monitor (37) should fail.

Figure 6:
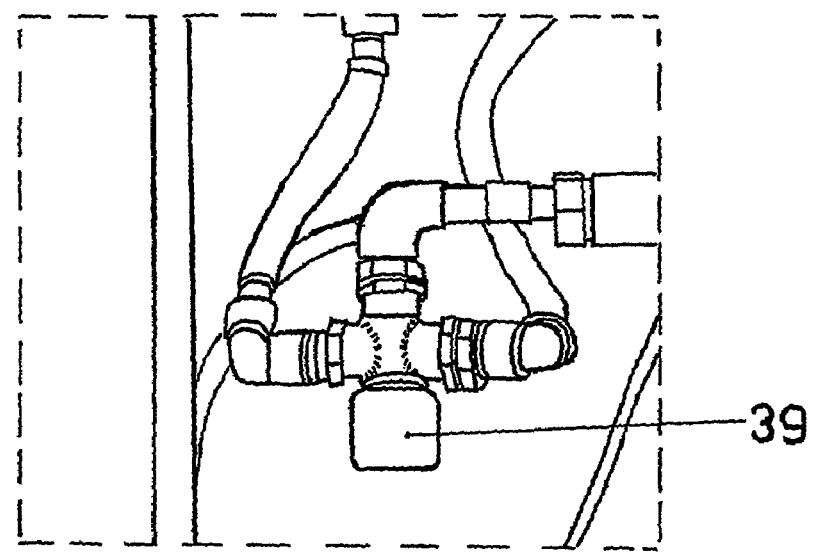
FIG. 6 shows the thermostatic mixing valve.
Figure 11:
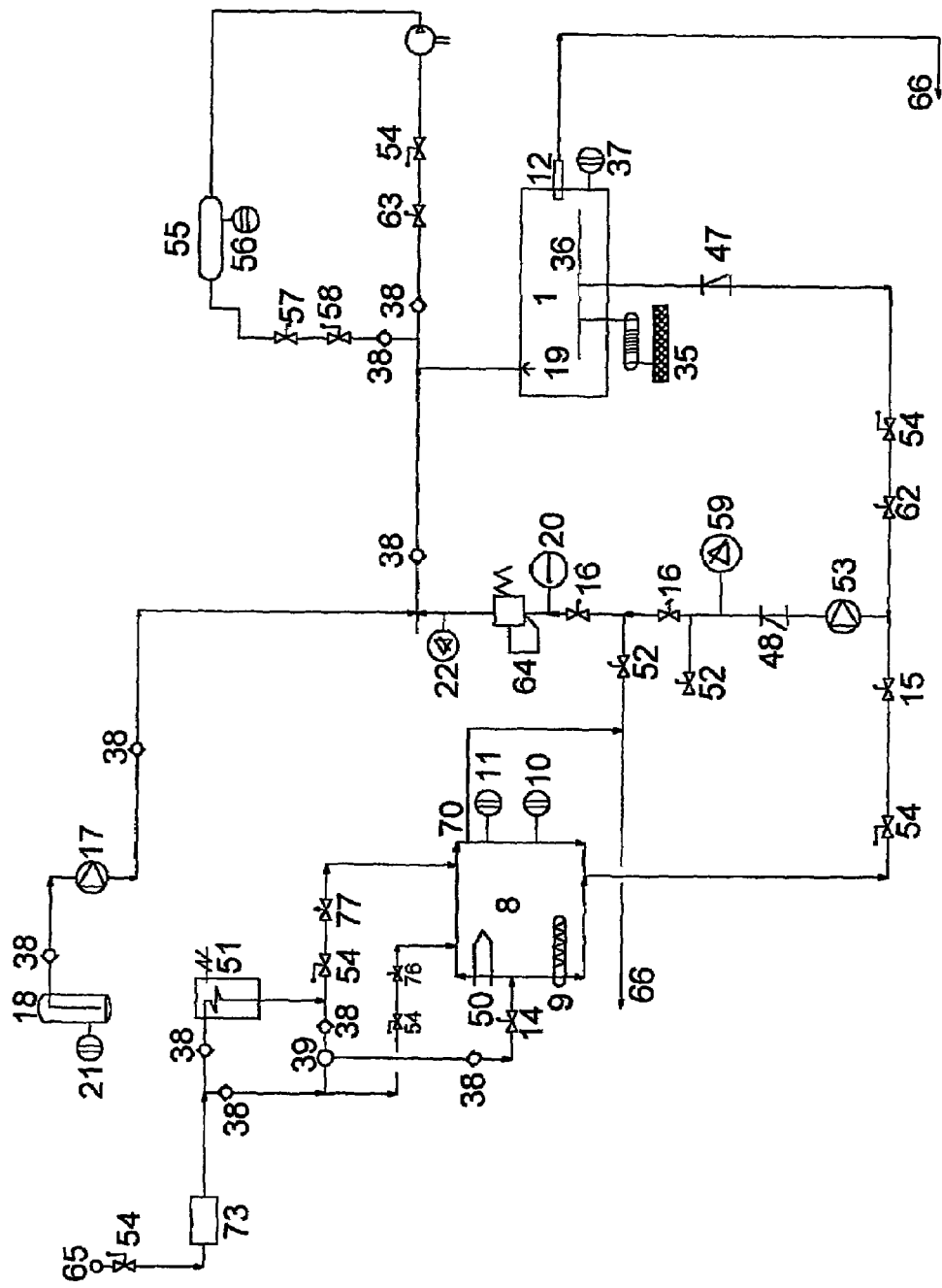
FIG. 11 shows a scheme of the hydraulic circuit.

FIG. 6 and FIG. 11 show the mixing thermostatic valve (39) meant to mix the cold water from the general mains (65) and the hot water from the electrical heater or gas heater (51). The outlet of mixed water from the thermostatic valve feeds the maintenance unit with said water at a controlled temperature (8), being provided with temperature control means (50) that send a signal indicating the temperature of the water to the controller, which then compares this with the preselected temperature; if the temperature is higher or lower than the preselected one a signal is sent to the PLC to open the electrovalves that supply hot or cold water, allowing to adjust the water temperature to the programmed temperature.

Figure 7:
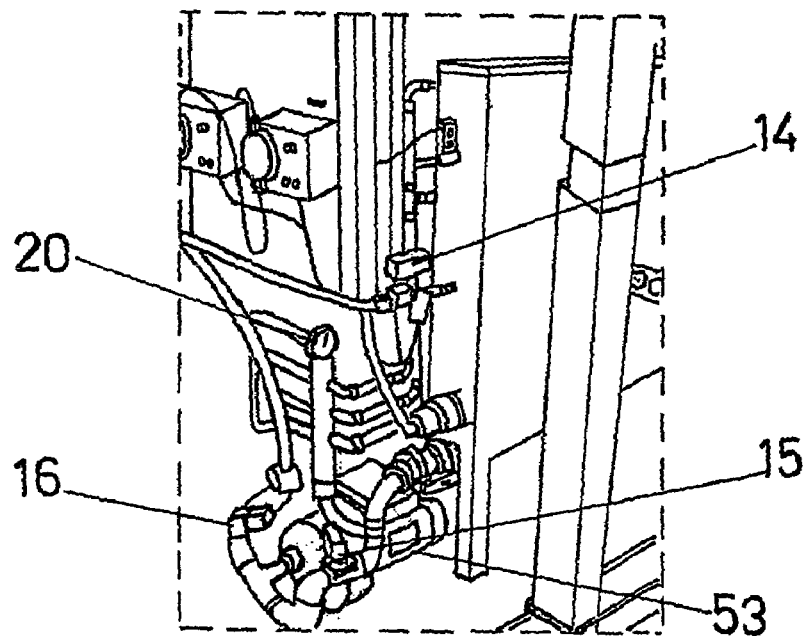
FIG. 7 shows the arrangements of the hydraulic circuit valves.

FIG. 7 shows part of the hydraulic circuit, which comprises a motor pump (53) for recirculating the liquids used in the washing and rinsing process. In addition, this motor pump (53) is also used together with the logical switching of the electrovalves (15, 16, 52 and 62) to evacuate said liquids; a pressure gauge (20) indicating the working pressure, a pressure and flow meter (64) (FIG. 11), a pressostat (22) as an overpressure safety measure, as well as for electrovalve (14), for filling the maintenance unit (8), the electrovalve (15) for initiating the filling of the hot water maintenance unit (8) and the electrovalve (16) for recirculating the water collected at the bottom of the enclosure (1).

Figure 8:
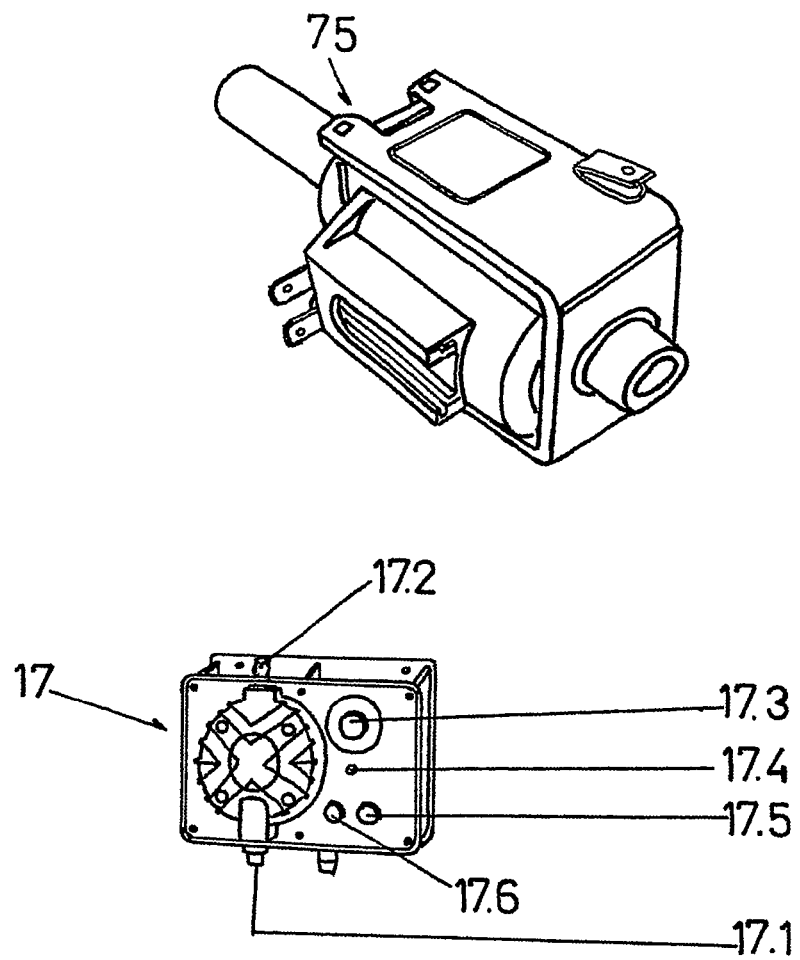
FIG. 8 shows the impulse electrovalves (hydraulic injector) for the additive liquids.

FIG. 8 shows the impulse electrovalve (17) next to a hydraulic injector (75) that can be used instead of the impulse electrovalve; said electrovalve is provided with a liquid inlet check valve (17.1) and an outlet check valve (17.2), a regulator (17.3), a scale selector (17.4), an impulse electrovalve switch (17.5) and a protection fuse (17.6).

Figure 9:
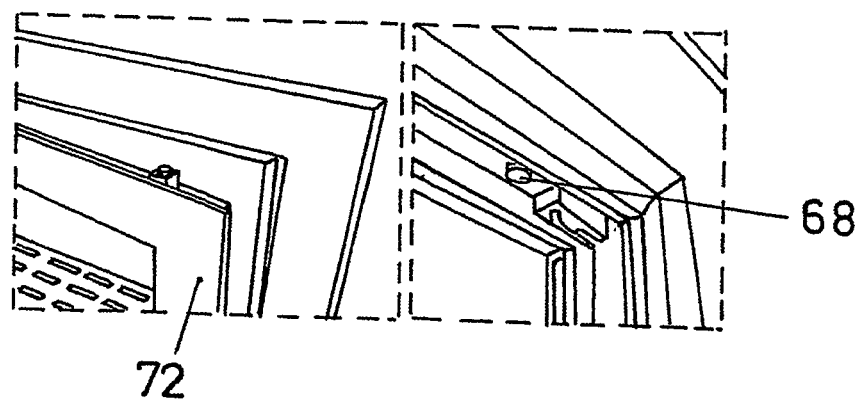
FIG. 9 shows the detector of the enclosure door.

FIG. 9 shows an enlarged view of a safety capacitance sensor (68) installed on the frame of the enclosure door (72), so that if said door should open during the operational cycle of the machine the system will stop.

Figure 10:
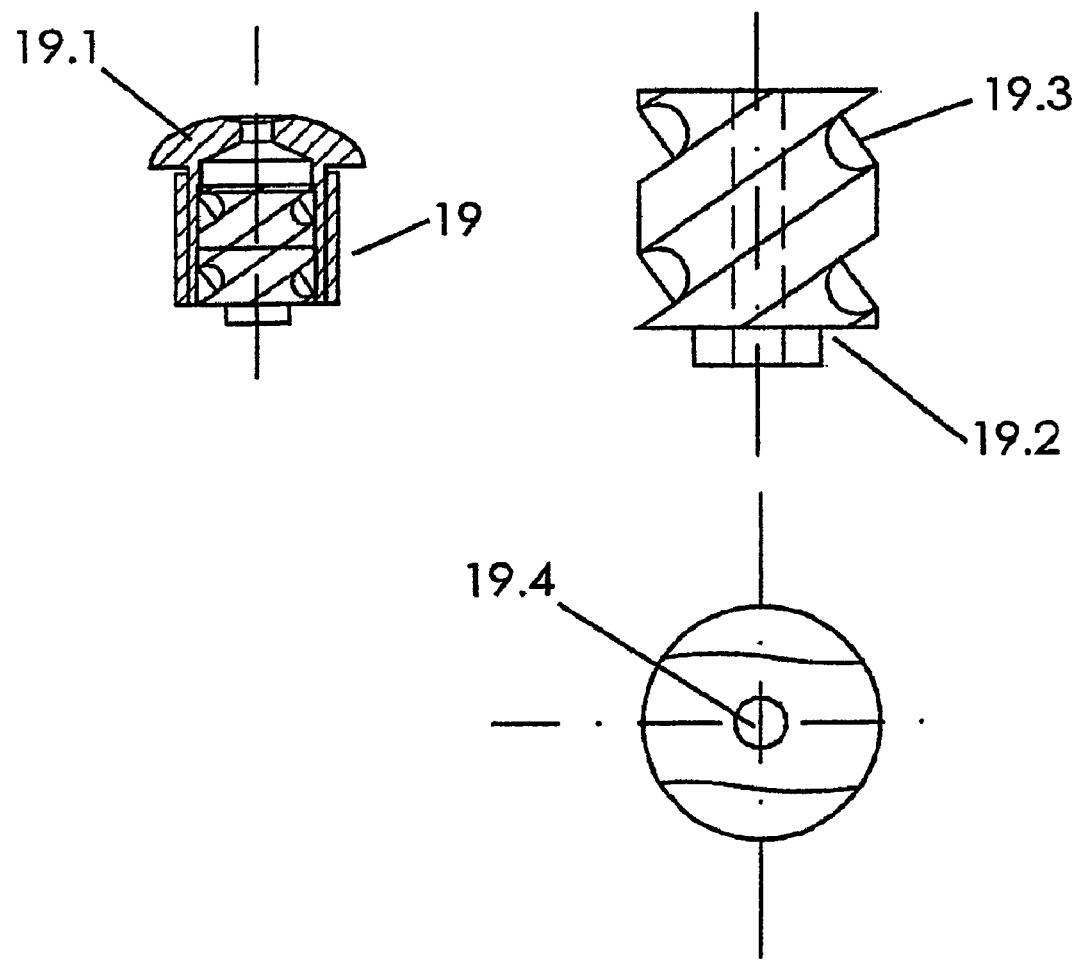
FIG. 10 shows an enlargement of the mist-effect spray nozzles.

FIG. 10 shows the spray nozzle (19), which can be removed and which comprises an external body (19.1) that houses a cylindrical element (19.2) which is provided on its perimeter with a semicircular section propeller (19.3) with a through orifice (19.4)

FIG. 11 shows the hydraulic circuit of the assembly that is the object of the invention, revealing the inlet (65) of mains water that after passing through a manual valve (54), passes through the lime remover (73) and continues towards both the thermostatic valve (39) and the gas heater or electrical heater (51), with two check valves (38) provided before it. The electrical or gas heater (51) heats the water and then with the thermostatic valve (39) mixes the cold water (65) from the mains and the water from the electric or gas heater (51) at the pre-programmed washing temperature, storing it in the maintenance unit (8). In addition, this unit is provided with a temperature probe (50) that sends a signal to the PLC, so that if the temperature in this unit should be higher or lower than the selected temperature it is adjusted by means of an independent circuit with an inlet of cold water from the mains with a manual valve (54) and an electrovalve (74) and an inlet from the electric or gas heater (51) with a manual valve (54) and an electrovalve (77), adjusting the water temperature in said unit to that previously selected with the controller. The maintenance unit is provided with sensors that detect the minimum level (10) and the maximum level (11) for controlling the unit's emptying and filling.

The controlled water maintenance unit (8) is provided at its top with an overflow pipe (70) so that if the valve (14) is not properly closed the water can leave through said pipe directly to the drain (66).

Said figure also shows the electrovalve (14) for filling the maintenance unit (8), the electrovalve (15) for starting the wash and the electrovalves (16) and (62) for recirculation, while the electrovalve (52) performs the drainage (66).

The entire assembly requires only one motor pump (53) for washing, rinsing, recirculation and for evacuation of the liquids, by virtue of a logical programmed switching of the electrovalves (15, 16, 52 and 62).

In the part of the circuit in charge of supplying the cleaning products one can see the impulse electrovalve (17), the shampoo container (18) and the level of the additive liquids (21). Instead of the impulse electrovalve (17) it is possible to use a hydraulic injector (75).

The part comprising the Venturi system for disinfection shows an opening and closing electrovalve (57), a storage deposit (55) and a level monitor (56), as well as a needle valve for manual control (58), as well as the corresponding check valve (38) to prevent an early mixture of the products.

A further electrovalve (63) opens the air supply for automatic cleaning of the spray nozzles, provided with the corresponding manual valve (54) and check valves (38).

The inside of the enclosure (1) is also shown to have a swivelling and folding floor (36) beneath which is a load cell (35) meant to detect the presence of the animal and therefore to prevent the activation of the disinfection process in the enclosure (1). At the outlet of the enclosure base is a filter (47) which prevents any impurities from entering the hydraulic circuit. A safety overflow pipe (12) and a level monitor (37) for the enclosure water are also provided.

There is a second microfilter (48) located in the drain circuit that collects impurities in the used water in order to prevent these from reaching the elements of the circuit and the drain (66). At the outlet of said microfilter (48) is a pressostat (59) that detects the pressure difference in the hydraulic circuit between the filter inlet and outlet, showing on the control panel that the filter is saturated if the pressure is beneath a predetermined pressure. The warning message will remain until the filter has been cleaned.

The hydraulic circuit is provided with a safety pressostat (22), a pressure and flow regulator (64) and a pressure gauge (20) that shows the circuit pressure.

The station is provided on the inside with an air expeller-suctioner (71) for vacuuming and hygiene of the enclosure (2).

It is not considered necessary to extend this description any further for any expert in the field to understand the scope of the invention and the advantages derived thereof.

The materials, shape, size and arrangement of the elements may vary as long as the essence of the invention remains unchanged.

The terms used in this memory should be understood in a wide and non-limiting sense.

What is claimed is:

1. Station for conditioning, washing, disinfection, deparasitation and hydromassaging animals, characterised in that said station is made with panels that insulate it from the outside, and comprises a glassed module (2) where it is possible to condition the animals before and after they are washed, further comprising the washing enclosure (1) itself, and the control panel (3), which is provided with a manually-operated button (26) to begin the disinfection cycle before each wash, and an emergency stop button (6), as well as token slots for washing, rinsing and drying (4) and for additional drying (5), a sequential cycle system (74) in which the entire unit is controlled by a programmable logic controller (PLC), provided with a remote communication system and a bad odour extractor; another extractor controlled by an automated hygrometer to extract the internal humidity level, a frequency variator-converter, as well as indicators of the maximum (11) and minimum (10) levels of the hot water maintenance unit (8); inside the enclosure (1) is installed a load cell (35) that is activated by the weight of the animal, by means of the swivelling and folding floor (36), so that the internal disinfection of the washing enclosure (1) is not allowed while there is an animal inside; the enclosure roof is inclined and is provided with spray nozzles (19), through which the water is projected and which are removable and self-cleaning; the application of the gels or cleaning products is automatically or manually controlled; in addition, the hydraulic circuit comprises safety means, check valves (38), manual valves (54) and electrovalves (14, 15, 16, 52, 62, 76 and 77), a water pressure and flow regulator (64), a motor pump (53) for washing, rinsing, recirculation and drainage, as well as a thermostatic mixing valve (39); a system for charging by means of cards, tokens or coins (4) (5), washing and drying counters, a lime remover (73).

2. Station for conditioning, washing, disinfection, deparasitation and hydromassaging animals, according to claim 1, characterised by a maintenance unit (8) that stores water at a preselected temperature, and a temperature-detection means (50), that sends a signal to the temperature regulator that will compare the actual temperature to the preselected one and send a signal to the PLC, which by means of the electrovalves (76) and(77) supplies either hot or cold water to the maintenance unit, adjusting the temperature to the preselected value; in addition, each maintenance unit (8) is provided with maximum (11) and minimum (10) level indicators and with a water overflow system (70) as an emergency drain.

3. Station for conditioning, washing, disinfection, deparasitation and hydromassaging animals, according to claim 1, characterised in that the thermostatic or mixing valve (39)

allows to select the programmed temperature for the cycle by mixing cold water from the mains system (65) and hot water from the electrical or gas heater (51).

4. Station for conditioning, washing, disinfection, deparasitation and hydromassaging animals, according to claim 1, characterised in that the spray nozzles (19) can be replaced and self-cleaned with pressurised air; they comprise an external body (19.1), an internal part (19.2) having a propeller (19.3) with a semi-circular section and a vertical through orifice (19.4) that provides a mist and hydromassaging effect; a pressurised air generator is provided for the nozzle automatic cleaning.

5. Station for conditioning, washing, disinfection, deparasitation and hydromassaging animals, according to claim 1, characterised in that the disinfectant dispenser comprises a storage deposit (55) and a level monitor (56), with the disinfectants supplied to the hydraulic circuit manually-controlled by a Venturi-effect system, with a cone-needle manual regulation valve (58), while opening and closing is effected by the electrovalves (57) and (61) provided for such purpose, with the corresponding check valves (38).

6. Station for conditioning, washing, disinfection, deparasitation and hydromassaging animals, according to claim 1, characterised in that the hydraulic circuit incorporates check valves (38) that prevent the backflow of the different liquids into the hot-water maintenance unit and the additive liquids deposit, preventing early and uncontrolled mixtures.

7. Station for conditioning, washing, disinfection, deparasitation and hydromassaging animals, according to claim 1, characterised in that the motor pump (53) of the hydraulic circuit used for washing and rinsing and to recirculate the liquids is also used to drain said liquids with a logical switching of the circuit's electrovalves.

8. Station for conditioning, washing, disinfection, deparasitation and hydromassaging animals, according to claim 1, characterised in that the gels or cleaning products are provided in an automated manner by means of impulse electrovalves (17) and storage deposits (18) with a level monitor (21).

9. Station for conditioning, washing, disinfection, deparasitation and hydromassaging animals, according to claim 8, characterised in that the cleaning gels or liquids are supplied in an automated manner by a hydraulic injector (75).

10. Station for conditioning, washing, disinfection, deparasitation and hydromassaging animals, according to claim 1, characterised in that the station is provided with a bad odour extractor and a second extractor connected to an automatic hygrometer that reduces the humidity level inside the enclosure and the elements and equipment cabin.

11. Station for conditioning, washing, disinfection, deparasitation and hydromassaging animals, according to claim 1, characterised in that both the glassed module (2) and the enclosure (1) are provided with an internal lamp, wherein the lamp of the enclosure (1) is automatically turned on as the cycle begins and turned off as the cycle ends.

12. Station for conditioning, washing, disinfection, deparasitation and hydromassaging animals, according to claim 1, characterised in that in the enclosure (1), under the swivelling and folding floor (36), is provided a load cell (35) which, in addition to acting as a safety element to prevent the start of the disinfection cycle when the animal is inside the enclosure (1), is further used as a means to indicate the weight of the animal, shown on a digital display; in addition the inside of said enclosure (1) is provided with an overflow pipe as an emergency drain (12) and a water level monitor (37).

13. Station for conditioning, washing, disinfection, deparasitation and hydromassaging animals, according to claim 1, characterised in that the different processes are indicated by sequential indication means (74) and acoustically indicated by a voice system.

14. Station for conditioning, washing, disinfection, deparasitation and hydromassaging animals, according to claim 1, characterised in that it is provided with an intercommunication system allowing to check of the operation of the stations remotely, as well as to control the level of the additive liquids.

15. Station for conditioning, washing, disinfection, deparasitation and hydromassaging animals, according to claim 1, characterised in that a filter (47) is installed in the hydraulic circuit in order to retain any impurities and prevent these from reaching the animal, during the recirculation process, or the elements of the hydraulic circuit, while a second microfilter (48) collects impurities in the water to prevent them from reaching the circuit elements and the drain. At the outlet of the microfilter (48) is provided a pressostat (59) that detects the change in pressure in the hydraulic circuit between the inlet and outlet of said microfilter, sending a signal to the PLC, and if the pressure is below a predetermined one a signal is sent to the control panel (3) to indicate that the filter is saturated; after the filter has been cleaned the warning lamp and sound will turn off.

16. Station for conditioning, washing, disinfection, deparasitation and hydromassaging animals, according to claim 1, characterised in that the door (72) of the enclosure (1) is provided with a capacitive sensor (68) that stops the cycle if said door (72) should open, while the electrical board door is provided with a safety switch which disconnects the general power supply of the equipment if said door is opened.

17. Station for conditioning, washing, disinfection, deparasitation and hydromassaging animals, according to claim 1, characterised in that the hydraulic circuit includes a water pressure and flow regulator (64), as well as a pressure gauge (20) that indicates the pressure of the hydraulic circuit in order to regulate it, incorporating as a safety measure a pressostat (22) which in the event of a pressure rise disconnects the hydraulic system.

18. Station for conditioning, washing, disinfection, deparasitation and hydromassaging animals, according to claim 1, characterised in that an air expeller-suctioner is installed in the station for final grooming of the animals and vacuuming and hygiene of the enclosure.

19. Station for conditioning, washing, disinfection, deparasitation and hydromassaging animals, according to claim 1, characterised in that a frequency variator-converter is installed, which is used both to regulate the different speeds of the drying turbine and to regulate the rotation speed of the motor pump (53), as well as a means for adapting to the various frequencies and voltages of the electrical grids of other countries.

20. Station for conditioning, washing, disinfection, deparasitation and hydromassaging animals, according to claim 1, characterised in that a safety system is installed in the drying elements which disconnects the drying cycle if the circuit is overheating; the system is also provided with a temperature detector that constantly sends a signal to a temperature controller, which compares the actual values with the preselected values and sends a signal to the programmable automat or PLC provided in the electronic system, so that if the drying temperature exceeds the temperature preselected at the controller the electrical power is disconnected until the air is cooled to said preselected temperature.

21. Station for conditioning, washing, disinfection, deparasitation and hydromassaging animals, according to claim 1, characterised in that the regulated water maintenance unit (8) is provided on its top part with an overflow pipe (70), so that if the electrovalve (14) does not close properly it will act as an emergency drain, allowing the water to reach the general drain directly (66); another overflow pipe (12) on the bottom of enclosure (1) allows to evacuate the water if the detector (37) should fail.

22. Station for conditioning, washing, disinfection, deparasitation and hydromassaging animals, according to claim 1, characterised in that the pressurised air generator unit (60) is used to automatically clean the spray nozzles (19) by means of the electrovalve (63) and the manual valve (54).

\* \* \* \* \*